G. BOYD.
Coffee-Roaster.
No. 160,384.
Patented March 2, 1875.
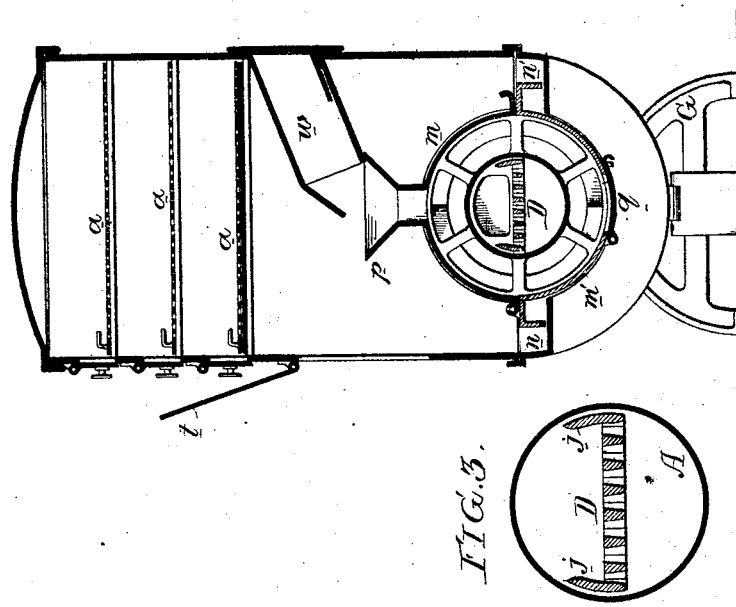
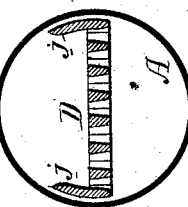
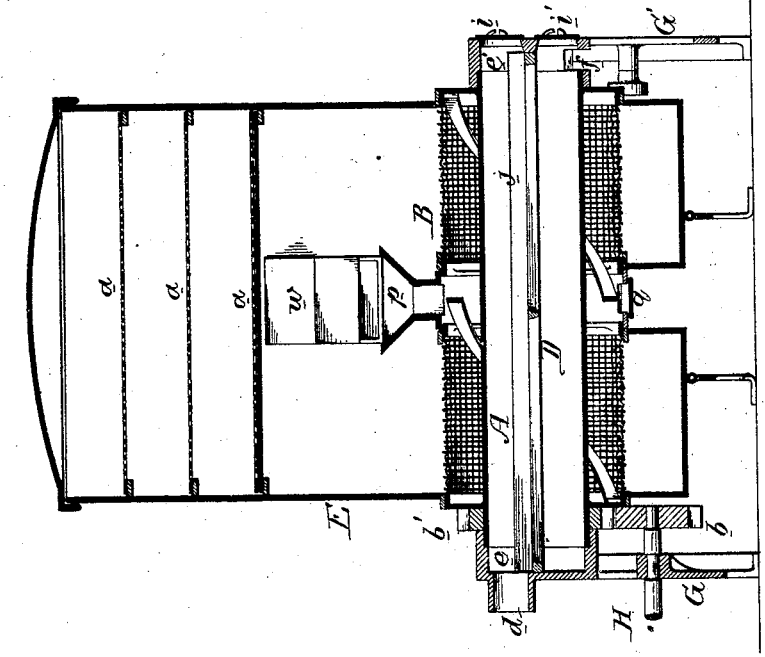

UNITED STATES PATENT OFFICE.

GEORGE BOYD, OF PHILADELPHIA, PENNSYLVANIA.

IMPROVEMENT IN COFFEE-ROASTERS.

Specification forming part of Letters Patent No. 160,384, dated March 2, 1875; application filed July 31, 1874.

*To all whom it may concern:*

Be it known that I, GEORGE BOYD, of the city of Philadelphia, Pennsylvania, have invented an Improved Coffee-Roaster, of which the following is a specification:

The objects of my invention are, first, to roast coffee rapidly and thoroughly; and, second, to cause the fumes of the coffee as it is being roasted to pass through and impregnate roasted bread or other suitable farinaceous substance, which, when thus impregnated, can be used as a cheap substitute for coffee.

The first object I attain by the combination of a rotating cylinder, A, and screen B, and fixed grate D, (shown in the vertical section, Figure 1, and transverse vertical section, Fig. 2, of the accompanying drawing,) the fuel being placed on the grate, and the coffee being contained in the space between the said cylinder A and screen B.

The second object I attain by the combination of the said screen with a casing, E, the upper portion of which contains any desired number of perforated detachable trays, a a, the bread or other suitable farinaceous substance being placed on these trays, so that it will be impregnated with the fumes which escape from the screen, all as shown in the accompanying drawing, which I will now proceed to describe more minutely.

G and G' are two standard or end frames, the former having a circular recess, e, for receiving one end of the cylinder B, and the other having a like recess, e', for receiving the opposite end of the cylinder, which is arranged to turn freely in the said recesses of the two standards, the cylinder being driven, in the present instance, from a shaft, H, through the medium of the cog-wheels b b'. A grate, D, contained within the cylinder A, but free from contact therewith, extends from standard to standard, and is secured to the same. Suitable fuel is introduced from time to time through an opening furnished with a suitable door, i, in the standard G', which has also an ash-pit door, and the products of combustion escaping through the outlet d in the standard G, the ashes being raked from the space below the grate at intervals, and caused to pass through an opening, f. On each edge of the said grate is a flange, j, (best observed in the enlarged sectional view, Fig. 3,) in order to prevent the ashes and cinders from gaining access to the spaces between the grate and cylinder and interfering with the free rotation of the latter. The cylindrical screen B is made in two parts, which are connected to the cylinder A by suitable arms, as shown in Fig. 2. The annular space between the two portions of the screen is closed above by a segment, m, hinged at one end to a bar, n, which extends from standard to standard, and resting at the opposite end on a similar bar, and the said annular space is closed below by a segment, m', secured to the same bars n n. The upper segment m has a hopper, p, for receiving the coffee to be roasted, and the lower segment has a door, q, for the discharge of the roasted coffee.

This arrangement of rotating screen combined with segments and with internal spiral ribs for distributing the coffee is too similar to that described in the application allowed to me and John H. Grubb on the 25th day of March, 1874, to need further description.

The casing E, which surrounds the screen, is secured to the stationary portion of the frame-work, and is carried upward to the extent, or about the extent, shown in the drawing.

Both the upper and lower portions of the casing can be detached when access is to be had to the rotating screen.

In the upper portion of the casing are the above-mentioned trays a a, consisting of wire-gauze or perforated plates, these plates being detachable from the casing through suitable doorways. It will be evident that bread or other farinaceous substance placed on these trays must be impregnated with the fumes of the coffee passing from the screen into the casing.

A chute, w, in the casing permits the ready introduction of the coffee to the hopper, and a door, t, in front of the casing allows ready access to be had to the interior of the latter.

The screen B may be made of wire-gauze or of perforated plates, or, in fact, of nonperforated plates, in which case the only vent for the escape of the coffee-fumes into the casing E will be through the hopper $p$.

I claim as my invention—

The combination of the rotating cylinder A, its surrounding screen B, and the fire-grate D, arranged within the cylinder, as set forth.

In testimony whereof I have signed my name to this specification in the presence of two subscribing witnesses.

GEORGE BOYD.

Witnesses:
 WM. A. STEEL,
 HUBERT HOWSON.